United States Patent
Park

(10) Patent No.: US 7,920,311 B2
(45) Date of Patent: Apr. 5, 2011

(54) HOLOGRAPHIC STORAGE MEDIUM AND METHOD AND APPARATUS FOR RECORDING AND/OR REPRODUCING DATA TO AND/OR FROM A HOLOGRAPHIC STORAGE MEDIUM

(75) Inventor: Hyun-soo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

(21) Appl. No.: 11/829,557

(22) Filed: Jul. 27, 2007

(65) Prior Publication Data

US 2008/0100891 A1     May 1, 2008

(30) Foreign Application Priority Data

Nov. 1, 2006   (KR) .................... 10-2006-0107469

(51) Int. Cl.
G03H 1/28        (2006.01)
(52) U.S. Cl. ......................................... 359/24
(58) Field of Classification Search .......... 359/3, 10–11, 359/22–25, 32, 33, 35; 369/100–104, 124.1–124.15; 430/1, 2
See application file for complete search history.

(56) References Cited

U.S. PATENT DOCUMENTS

| | | | |
|---|---|---|---|
| 2004/0179251 A1* | 9/2004 | Anderson et al. ............ | 359/3 |
| 2006/0007512 A1 | 1/2006 | Kanesaka et al. | |
| 2006/0126143 A1 | 6/2006 | Ezura et al. | |
| 2006/0146386 A1 | 7/2006 | Yamatsu et al. | |

FOREIGN PATENT DOCUMENTS

JP         2005-310308         11/2005

OTHER PUBLICATIONS

Hans Coufal et al. (Eds.), Springer Series in Optical Sciences (v. 76, 2000)(ISBN 3-540-66691-5).*
Merriam-Webster Collegiate Dictionary 63 (11th ed. 2003).*
International Search Report and Written Opinion issued in corresponding PCT International Application No. PCT/KR2007/005096 dated Jan. 24, 2008.

* cited by examiner

Primary Examiner — Stephone B Allen
Assistant Examiner — Jennifer L. Doak
(74) Attorney, Agent, or Firm — NSIP Law

(57) ABSTRACT

A method and apparatus for recording and/or reproducing data to and/or from a holographic storage medium and a holographic storage medium therefor are provided. The method of reproducing data from the holographic storage medium, in which a hologram containing data is recorded through interference between a signal beam and a reference beam, the data being recorded in pages and a plurality of the pages being recorded in a book, includes controlling the reference beam so that an increasing/decreasing order of a reference beam in a current book which is currently reproduced is reverse to an increasing/decreasing order of a reference beam in a previous book which was reproduced before the current book, and reproducing pages of the current book from the holographic storage medium according to the controlling of the reference beam.

39 Claims, 11 Drawing Sheets

ORDER INFORMATION

ORDERLY DECREASING PAGE

ORDERLY INCREASING PAGE

HOLOGRAPHIC STORAGE MEDIUM AND METHOD AND APPARATUS FOR RECORDING AND/OR REPRODUCING DATA TO AND/OR FROM A HOLOGRAPHIC STORAGE MEDIUM

CROSS-REFERENCE TO RELATED APPLICATION

This application claims the benefit of Korean Application No. 2006-107469, filed Nov. 1, 2006, in the Korean Intellectual Property Office, the disclosure of which is incorporated herein by reference.

BACKGROUND OF THE INVENTION

1. Field of the Invention

Aspects of the present invention relate to a holographic storage medium and a method and apparatus to record and/or reproduce data to and/or from the holographic storage medium.

2. Description of the Related Art

In optical holography, data is not stored on a surface of a recording medium, but is instead stored in a volume of the recording medium. A signal beam interferes with a reference beam within the recording medium, thus generating a plurality of interference gratings referred to as a data page. The interference gratings change the optical characteristics of the reference beam and cause overlapping to occur between the signal beam and the reference beam in a process referred to as "multiplexing." When data is reproduced from the holographic storage medium, a single reference beam is incident on the recording medium under the same conditions as those conditions used during the data recording, thereby generating a diffraction beam to reproduce the stored data page. The diffraction beam is detected by a detection array, which extracts a stored plurality of data bits from a measured intensity pattern. The data page contains the data bits or pixels. As such, when the data pages overlap in the volume of the recording medium, data storage capacity can be increased.

A hologram is recorded using a signal beam S to carry data and a reference beam R to interfere with the signal beam S. As illustrated in FIG. 1A, during recording of the hologram, the reference beam R and the signal beam S interfere with each other to generate an interference pattern, which is transferred to a holographic storage medium 1. As illustrated in FIG. 1B, during reproduction of the hologram, the original reference beam R is radiated onto the recorded hologram and the recorded hologram diffracts the reference beam R, whereby the output signal beam S is generated.

Recording in the holographic storage medium 1 is carried out due to interference between a signal beam S and a reference beam R. The signal beam S is produced by a spatial light modulator which generates a page comprised of a plurality of pixels. The produced signal beam S is transmitted into an optical system and interferes with the reference beam R on the holographic storage medium 1. An interference pattern produced by the interference between the signal beam S and the reference beam R is recorded in the holographic storage medium 1. Data reproduction is carried out by radiating the reference beam R onto the recorded interference pattern to cause diffraction of the recorded signal beam S, thereby outputting the information recorded in the recorded signal beam S.

A reference beam R used for a holographic storage medium can be controlled using various configurations of components. For example, a pair of galvano mirrors can be used with other components, such as a pair of galvano mirrors and a scanner, or a pair of galvano mirrors and a translator. In such cases, a position of the reference beam R on the holographic storage medium 1 is fixed while an angle of the reference beam R changes according to a recording page. Conventionally, a plurality of pages is recorded in the holographic storage medium 1 using different angles of the reference beam R to record each of the plurality of pages, and the plurality of recorded pages forms a "book." During reproducing, the angle of the reference beam R is also varied in order to reproduce the plurality of pages recorded on the holographic storage medium 1. Conventionally, a first page of every book is always reproduced using the same initial angle.

FIG. 2 illustrates a conventional method of changing the angle of a reference beam while reproducing pages. Referring to FIG. 2, book0 210, book1 220, book2 230, book3 240, and book4 250, each of which includes page0, page1, page2, and page3, are recorded in the holographic storage medium 1. Thus, an order of the pages recorded in each of the book0 210, book1 220, book2 230, book3 240, and book4 250 is page0, page1, page2, and page3. Hence, data must be reproduced in the same order as the data is recorded in order to properly reproduce the data from the holographic storage medium 1. In detail, page0 in book0 210 is reproduced with reference beam0, which is transmitted to the holographic storage medium 1 at an initial angle. Next, the angle of the reference beam0 is changed by a predetermined angle to generate reference beam1, and page1 in book0 210 is then reproduced using reference beam1. Next, the angle of reference beam1 is changed by a predetermined angle to generate reference beam2 and page2 in book0 210 is reproduced using reference beam2. Next, the angle of reference beam2 is changed by a predetermined angle to generate reference beam3 and page3 in book0 210 is reproduced using reference beam3. Next, the angle of reference beam3 is changed back into the initial angle to generate reference beam0, and thus page0 in book1 220 is reproduced using reference beam0.

As described above, in order to reproduce a first page in a subsequent book after all the pages in a previous book have been reproduced according to the conventional method, the angle of a reference beam must be returned to an initial position. The process of returning the angle of a reference beam to the initial position results in a delay, and decreases a data transmission rate.

SUMMARY OF THE INVENTION

Aspects of the present invention provide a recording and/or reproducing method and apparatus to quickly record and/or reproduce data to and/or from a holographic storage medium, and a holographic storage medium therefor.

According to an aspect of the present invention, a method of reproducing data from a holographic storage medium, in which a hologram containing data is recorded through interference between a signal beam and a reference beam, the data being recorded as pages, and a plurality of the pages being recorded in a book, includes controlling the reference beam so that an increasing/decreasing order of the reference beam in a current book which is currently reproduced is reverse to an increasing/decreasing order of the reference beam in a previous book which was reproduced right before the current book, and reproducing pages of the current book from the holographic storage medium according to the controlling of the reference beam.

According to an aspect, an angle at which the reference beam is incident on the holographic storage medium is changed to reproduce each of the pages of the current book and pages of the previous book, and the controlling of the reference beam includes controlling the reference beam so that a direction in which the angle of the reference beam is changed to reproduce the pages in the previous book is reverse to a direction in which the angle of the reference beam is changed to reproduce the pages in the current book.

According to an aspect, an order in which pages included in the previous book are arranged is reverse to or the same as an order in which the pages included in the current book are arranged.

According to an aspect, when the order in which pages included in the previous book are arranged is the same as the order in which the pages included in the current book are arranged, the method further includes rearranging the order of the pages reproduced from the holographic storage medium according to whether the current book or the previous book has the pages in a decreasing order.

According to an aspect, the rearranging of the pages includes identifying whether the current book or the previous book has pages in the decreasing order, and switching the order of the reproduced pages of the book identified as having the pages in the decreasing order into an increasing order.

According to an aspect, the identifying of whether the current book or the previous book has pages in the decreasing order includes using order information included in each of the pages in the current book or the previous book.

According to another aspect of the present invention, a method of recording data from a holographic storage medium, in which a hologram containing data is recorded through interference between a signal beam and a reference beam, the data being recorded in pages, and a plurality of the pages being recorded in a book, includes recording pages of a current book in the holographic storage medium in a different order from an order of pages of a previous book recorded right before the current book is reproduced so that a first page of the pages in the current book is reproduced at a reference beam angle at which a last page of the previous book was reproduced.

According to still another aspect of the present invention, a method of recording data from a holographic storage medium, in which a hologram containing data is recorded through interference between a signal beam and a reference beam, the data being recorded in pages, and a plurality of the pages being recorded in a book, includes inserting order information indicating an increasing or decreasing order of pages into each of the pages of the book when the pages are recorded.

According to yet another aspect of the present invention, an apparatus to reproduce data from a holographic storage medium, in which a hologram containing data is recorded through interference between a signal beam and a reference beam, the data being recorded in pages, and a plurality of the pages being recorded in a book, includes an optical processing unit to reproduce pages from the holographic storage medium using the reference beam, a memory unit to store the reproduced pages, and a control unit to control the reference beam so that an increasing/decreasing order of the reference beam in a current book which is currently reproduced is reverse to an increasing/decreasing order of a reference beam in a previous book which was reproduced before the current book.

According to a further aspect of the present invention, an apparatus to record data in a holographic storage medium, in which a hologram containing the data is recorded through interference between a signal beam and a reference beam, the data being recorded in pages, and a plurality of the pages being recorded in a book, includes an optical processing unit to record pages of a current book and pages of a previous book recorded right before the current book in the holographic storage medium using the signal beam and the reference beam, and a control unit to arrange the pages of the current book in a reverse order to an order of the pages of the previous book so that a first page of the current book is reproduced at a reference beam angle at which a last page of the previous book was reproduced, and to transmit the pages of the current book to the optical processing unit in order to be recorded.

According to another aspect of the present invention, an apparatus to record data in a holographic storage medium, in which a hologram containing the data is recorded through interference between a signal beam and a reference beam, the data being recorded in pages, and a plurality of the pages being recorded in a book, includes an optical processing unit to record pages of a book in the holographic storage medium using the signal beam and the reference beam, and a control unit to insert order information indicating an increasing or a decreasing order into each of the pages and to transmit the pages to the optical processing unit to record the pages including the order information.

According to still another aspect of the present invention, a holographic storage medium, in which a hologram containing data is recorded through interference between a signal beam and a reference beam, the date being recorded in pages, and a plurality of the pages being recorded in a book, includes recorded pages of a previous book, and recorded pages of a current book which are recorded right after the pages of the previous book are recorded. According to still another aspect of the present invention, an order in which the pages of the previous book are recorded is reverse to an order in which the pages of the current book are recorded.

According to yet another aspect of the present invention, a holographic storage medium, in which a hologram containing data is recorded through interference between a signal beam and a reference beam, the data being recorded in pages, and a plurality of the pages being recorded in a book, includes recorded pages of a book. According to yet another aspect, each of the current pages includes order information indicating whether the pages included in the book are recorded in an increasing order or a decreasing order.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become and more readily appreciated from the following description of the embodiments, taken in conjunction with the accompanying drawings of which.

DETAILED DESCRIPTION OF THE EMBODIMENTS

Figure 1A:
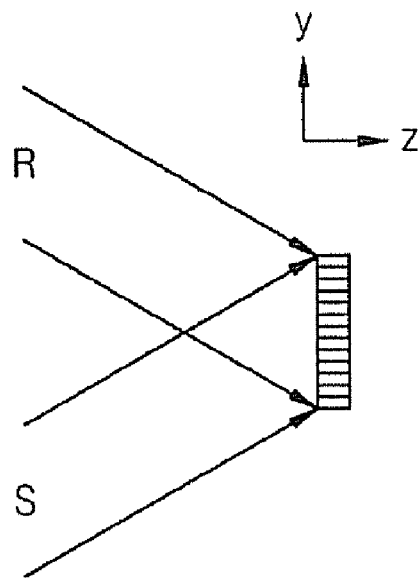
FIGS. 1A and 1B respectively illustrate conventional methods of recording and reproducing data to and from a holographic storage medium using optical holography.
Figure 1B:
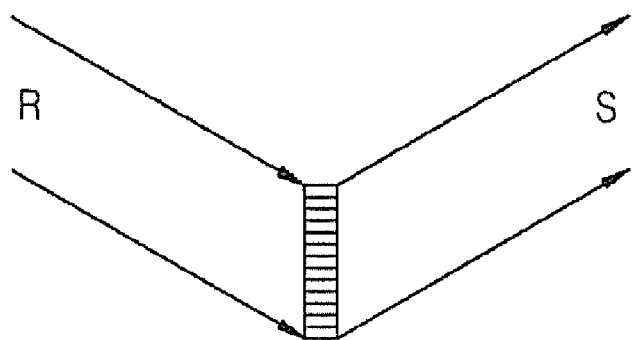
Figure 2:
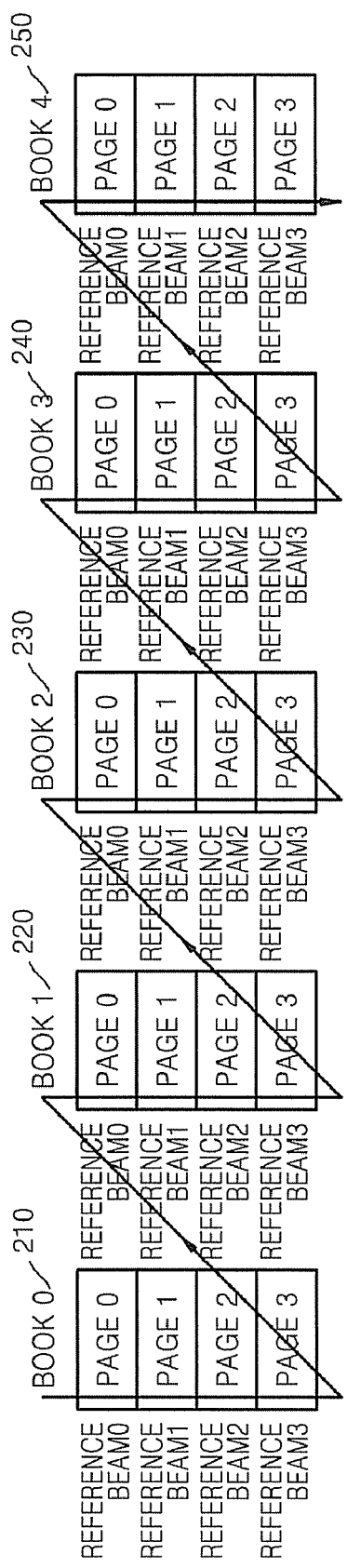
FIG. 2 illustrates a conventional method of changing the angle of a reference beam while reproducing pages.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
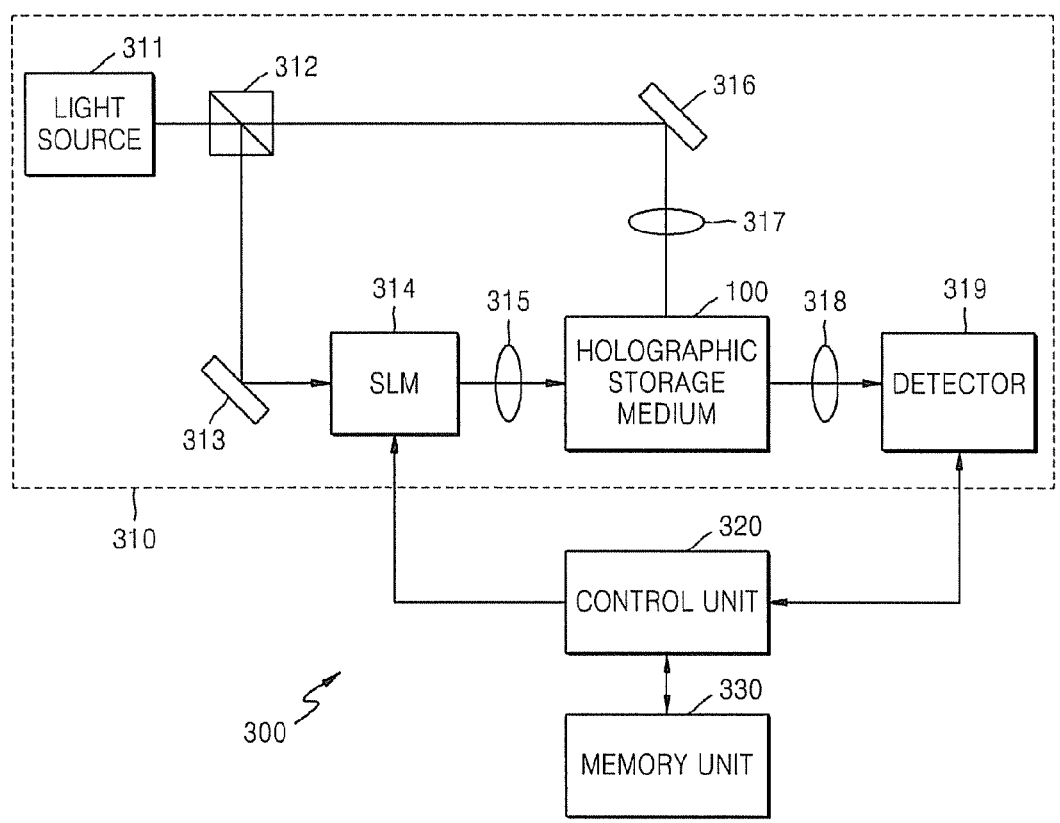
FIG. 3 is a schematic diagram of a recording and/or reproducing apparatus according to an embodiment of the present invention.

FIG. 3 is a schematic diagram of a recording and/or reproducing apparatus 300 according to an embodiment of the present invention. The recording and/or reproducing apparatus 300 includes an optical processing unit 310 into which a holographic storage medium 100 is inserted, a control unit 320 to control the optical processing unit 310 in order to record data to and/or reproduce data from the holographic storage medium 100, and a memory unit 330 to temporarily store data that is to be recorded to and/or reproduced from the holographic storage medium 100. The optical processing unit 310 includes a laser light source 311, a beam splitter 312, a first reflecting mirror 313, a spatial light modulator (SLM) 314, a first lens 315, a second reflecting mirror 316, a second lens 317, a third lens 318, and a detector 319. The SLM 314 may be various types.

The control unit 320 controls the optical processing unit 310, generates a data page including recording data, transmits the data page to the optical processing unit 310, and processes a signal reproduced by the optical processing unit 310 into data. In particular, in order to avoid returning the angle of a reference beam to an initial reference beam angle when the first page of each book recorded in the holographic storage medium 100 is reproduced, the control unit 320 controls the optical processing unit 310 to reproduce the first page of a current book using the same reference beam angle used to reproduce the last page of a previous book reproduced right before the current book.

When data is recorded in the holographic storage medium 100, coherent laser light is output from the laser light source 311 and split into a reference beam and a signal beam by the beam splitter 312. The signal beam is subjected to spatial light modulation (i.e., amplitude modulation) by the SLM 314. The modulated signal beam is focused on the holographic storage medium 100 by the first lens 315. Meanwhile, the second reflecting mirror 316 reflects the reference beam in order to radiate the reference beam on the holographic storage medium 100 through the second lens 317. Accordingly, the signal beam and the reference beam overlap with each other, forming an interference pattern that is recorded in a fine dense pattern in the holographic storage medium 100.

In addition, the control unit 320 arranges the pages of a current book in a reverse order to the order of the pages of the previous book, so that the first page of the current book is reproduced at a reference beam angle at which the last page of the previous book was reproduced, and transmits the pages of the current book to the optical processing unit 310 in the arranged reverse order. The control unit 320 also detects whether pages included in a book that is to be recorded are arranged in an increasing order or a decreasing order. According to an aspect of the present invention, the control unit 320 inserts order information indicating whether a book has pages in an increasing order or a decreasing order into each page of the book. However, the order information may be inserted in various ways, and is not required to be inserted into each page of every book. For example, order information may be inserted only into pages in a book which decrease in order, and not into pages in a book which increase in order, so that the increasing pages and the decreasing pages can be discriminated from each other.

In order to reproduce data recorded in the holographic storage medium 100, a reference beam having the same characteristics as the reference beam used to record a data page is radiated on the holographic storage medium 100 so that the data is reproduced by diffracted light corresponding to the interference pattern recorded in the holographic storage medium 100. The characteristics of the reference beam include, but are not limited to, a wavelength and an incident angle on the holographic storage medium 100. The diffracted light that corresponds to the interference pattern is collected by the third lens 318 in the detector 319, which includes a device to detect light, such as a charge-coupled device or a complimentary metal-oxide semiconductor (CMOS). Thus, a reproducing signal detected by the detector 319 is transmitted to the control unit 320.

In particular, the control unit 320 controls the optical processing unit 310 to reproduce the first page of a current book at a reference beam angle that has been used to reproduce the last page of the previous book. In addition, the control unit 320 temporarily stores reproduced pages in the memory unit 330. During the storage process, when the order of the reproduced pages in the currently reproduced book is reversed, the control unit 320 changes the order of the reproduced pages into the original order when the reproduced pages are brought from the memory unit 330 before being used so that the pages can be properly used.

Figure 4A:
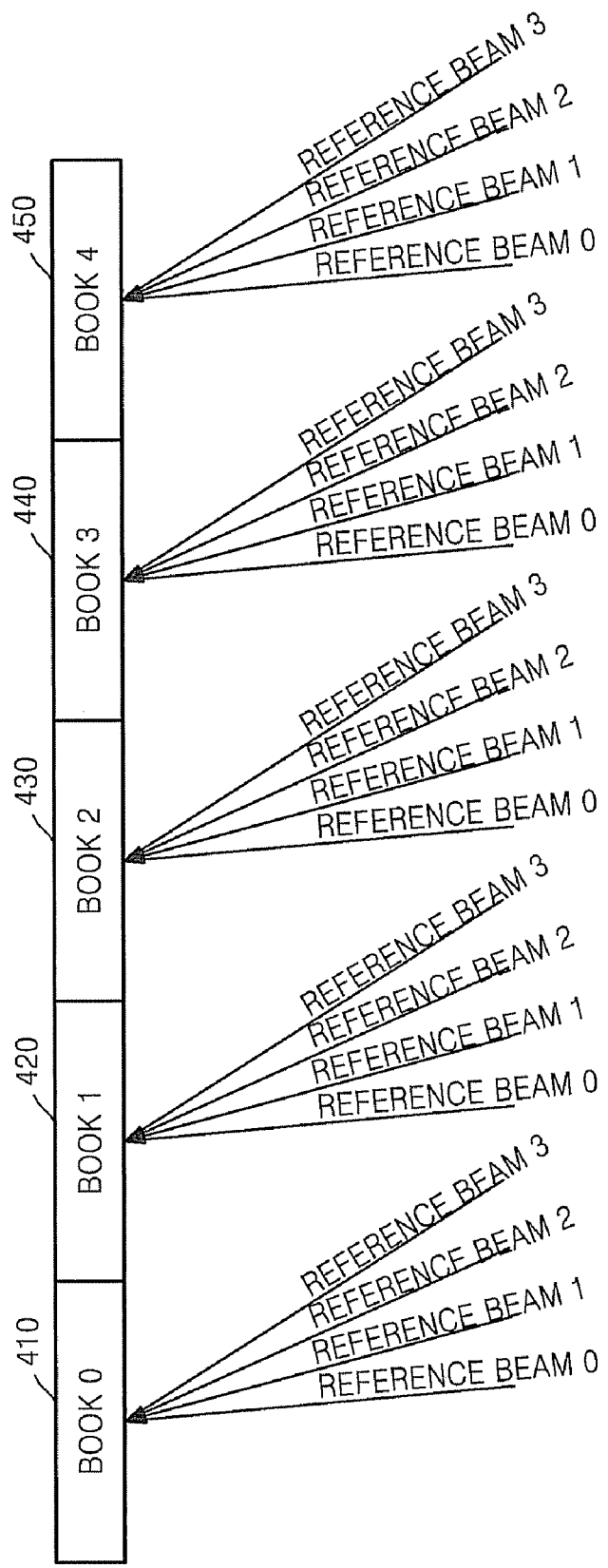
FIGS. 4A and 4B illustrate an order in which pages are reproduced from a holographic storage medium according to an embodiment of the present invention.
Figure 4B:
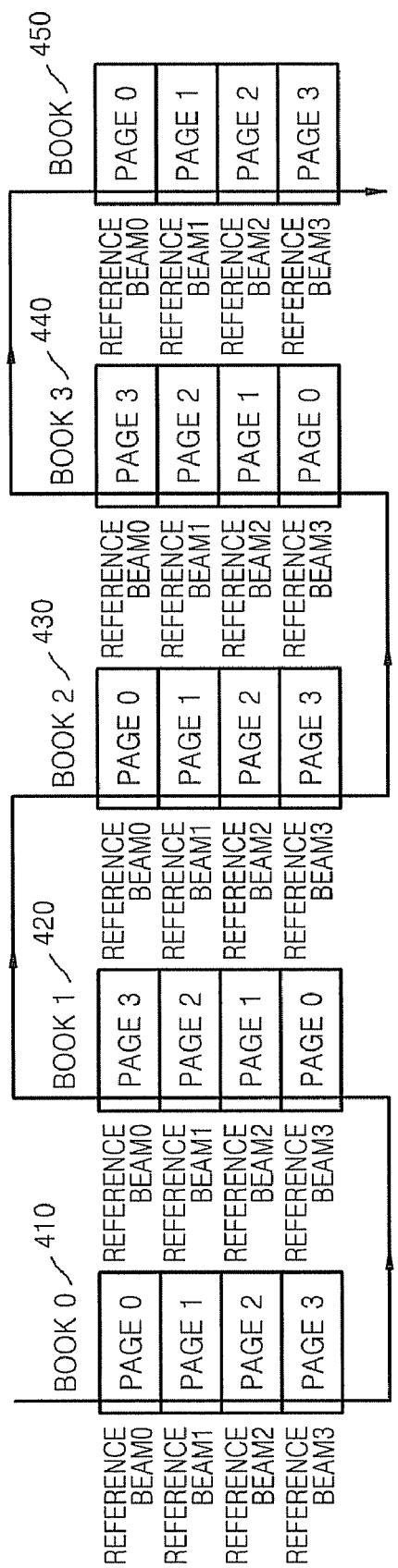

FIGS. 4A and 4B illustrate an order in which pages are reproduced from the holographic storage medium 100 according to an embodiment of the present invention. Referring to FIGS. 4A and 4B, a book0 410, a book1 420, a book2 430, a book3 440, and a book4 450 are recorded in the holographic storage medium 100 and page0, page1, page2, and page3 of each of the books are respectively recorded using a reference beam0, a reference beam1, a reference beam2, and a reference beam3. The reference beam0 corresponds to an initial reproducing angle. The reference beam1 corresponds to an angle obtained by adding a predetermined angle α to the initial reproducing angle. The reference beam2 corresponds to an angle obtained by adding the predetermined angle α to the angle of the reference beam1. The reference beam3 corresponds to an angle obtained by adding the predetermined angle α to the angle of the reference beam2. The number of reference beams may be increased or decreased according to an angle difference and recording or reproducing conditions. It is understood that more or less than five books may be used, and it is further understood that more or less than four pages may be included in each book.

Conventionally, as described above, a page0 is reproduced using the reference beam0, page1 is reproduced using the reference beam1, page2 is reproduced using the reference beam2, and page3 is reproduced using the reference beam3. Then, after these pages are reproduced, in order to reproduce the page0 of a subsequent book using the reference beam0 of a previous book, the angle of a reference beam is returned to the initial reproducing angle of the reference beam0 during movement to the subsequent book.

However, according to an aspect of the invention, pages of the subsequent book are arranged in a reverse order, as illustrated in FIG. 4B. Accordingly, when pages of book1 420 are reproduced after pages of book0 410 are reproduced, it is not necessary to adjust the optical processing unit 310 to return to the position having an initial reference angle used to radiate reference beam0. In other words, the angle of the reference beam3 used to reproduce the last page of the previous book0 410 is maintained and page0, page1, page2 and page3 of the book1 420 are sequentially reproduced using the reference beam3, reference beam2, reference beam 1 and reference beam0, respectively. For instance, when the initial reference beam angle is 10 degrees and the predetermined angle α is 3 degrees, page0, page1, page2 and page3 of the book0 410 are sequentially reproduced by respectively using reference beam angles of 10, 13, 16, and 19 degrees and page0, page1, page2 and page3 of the book1 420 are sequentially reproduced by respectively using reference beam angles of 19, 16, 13, and 10 degrees. According to an aspect of the present invention, the angle of the reference beam3 used to reproduce pages of the book0 410 may be slightly different from the angle of the reference beam3 used to reproduce corresponding pages of the book1 420 which use the reference beam with the same angle. However, the scope of the present invention includes adjusting such a slight difference.

In the embodiment of the present invention shown in FIG. 4B, the order of the reference beam0, the reference beam1, the reference beam2, and the reference beam3 respectively correspond to page0, page1, page2, and page3 of the book0 410 while the order of the reference beam3, the reference beam2, the reference beam1, and the reference beam0 respectively correspond to page0, page1, page2, and page3 of the book1 420 succeeding the book0 410. Thus, an increasing/decreasing order of a reference beam in a current book which is currently reproduced is reverse to an increasing/decreasing order of a reference beam in a previous book which was reproduced before the current book. Accordingly, the reference beam seamlessly makes the transition from reproducing page 3 of book0 410 to reproducing page0 of book1 420, instead of returning to the initial reference beam angle to reproduce page0 of the book1 420. When the book2 430 is reproduced after the book1 420 is completely reproduced, the reference beam0, the reference beam1, the reference beam2, and the reference beam3 are respectively used to reproduce page0, page1, page2, and page3 of the book2 430, thus returning to the same reference beams used to reproduce page0, page1, page2 and page3 of the book0 410, so that reproducing starts from page0 using the initial reference beam angle with respect to the book2 430.

When the above-described method is used, reproducing speed is increased since it is not necessary to return the reference beam angle to the initial value in order to reproduce a subsequent book. To use this method, the page orders of sequential books recorded in the holographic storage medium should alternate in increasing order and decreasing order. For recording, the first page of a current book may be recorded using a reference beam angle that is used to record the last page of a previous book, which is the same manner as that used in the above-described reproducing method. Accordingly, recording speed as well as reproducing speed can also be increased.

Figure 5A:
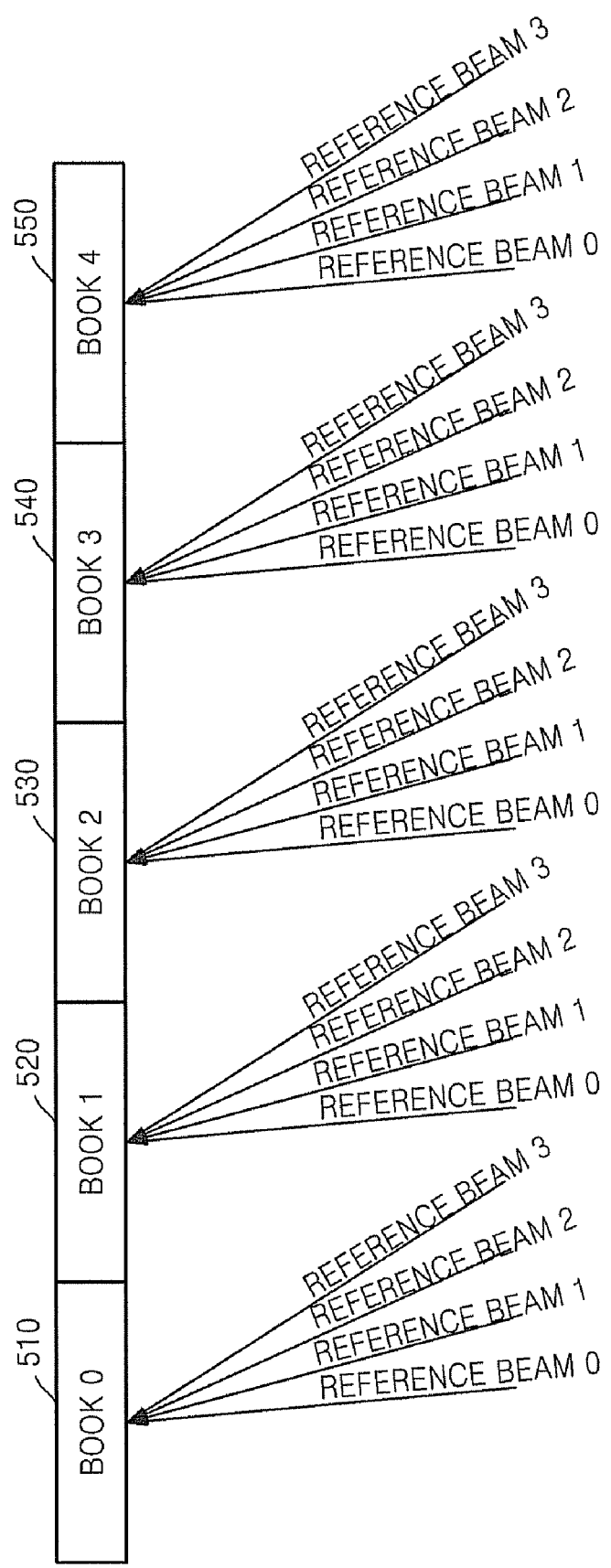
FIGS. 5A and 5B illustrate an order in which pages are reproduced from a holographic storage medium according to another embodiment of the present invention.
Figure 5B:
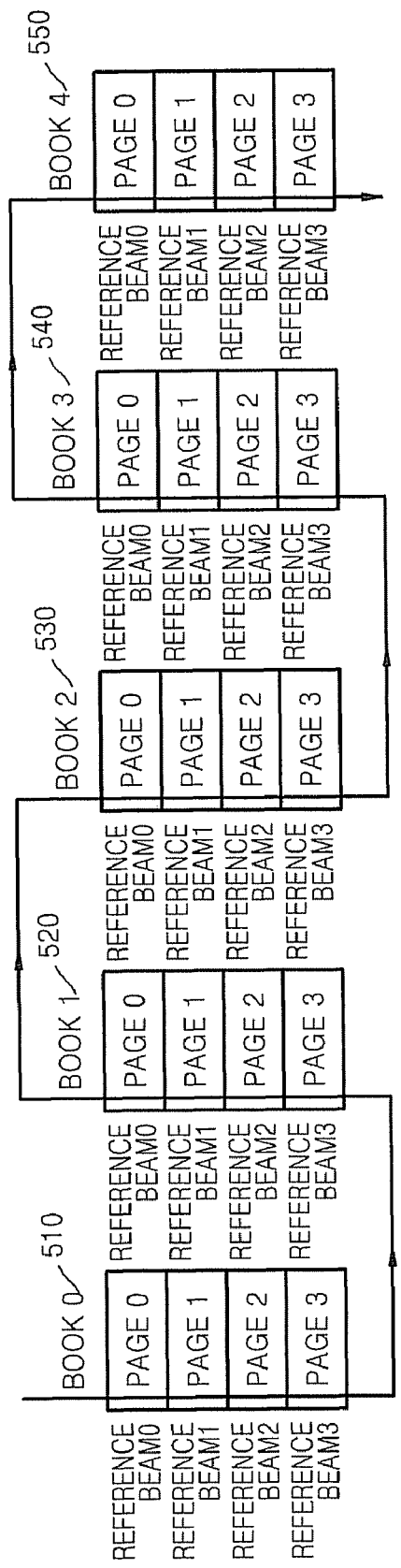

FIGS. 5A and 5B illustrate an order in which pages are reproduced from a holographic storage medium according to another embodiment of the present invention. Referring to FIGS. 5A and 5B, a book0 510, a book1 520, a book2 530, a book3 540, and a book4 550 are recorded in the holographic storage medium 100. More specifically, page0, page1, page2 and page3 of each of the books are recorded by respectively using a reference beam0, a reference beam1, a reference beam2, and a reference beam3.

According to another embodiment of the present invention, even when pages of each of the book0 510, book1 520, book2 530, book3 540, and book4 550 have only been recorded in an increasing order instead of in an alternating increasing-decreasing order, the book0 510, book1 520, book2 530, book3 540, and book4 550 can be reproduced without returning a reference beam angle to an initial value when each subsequent book is reproduced. Referring to FIG. 5B, when a current book is reproduced starting from the last page of the current book without changing a reference beam angle to return to an initial value after all the pages of the previous book are reproduced, a reproducing order is a page0, a page1, a page2, and a page3 of the book0 510, a page3, a page2, a page1, and a page0 of the book1 520, a page0, a page1, a page2, and a page3 of the book2 530, etc. In other words, the pages of every other book, such as the book1 520 and the book3 540 shown in FIG. 5B, are reproduced in a decreasing order, and accordingly the order of pages is reversed in every other book, such as the book1 520 and the book3 540.

Figure 5C:
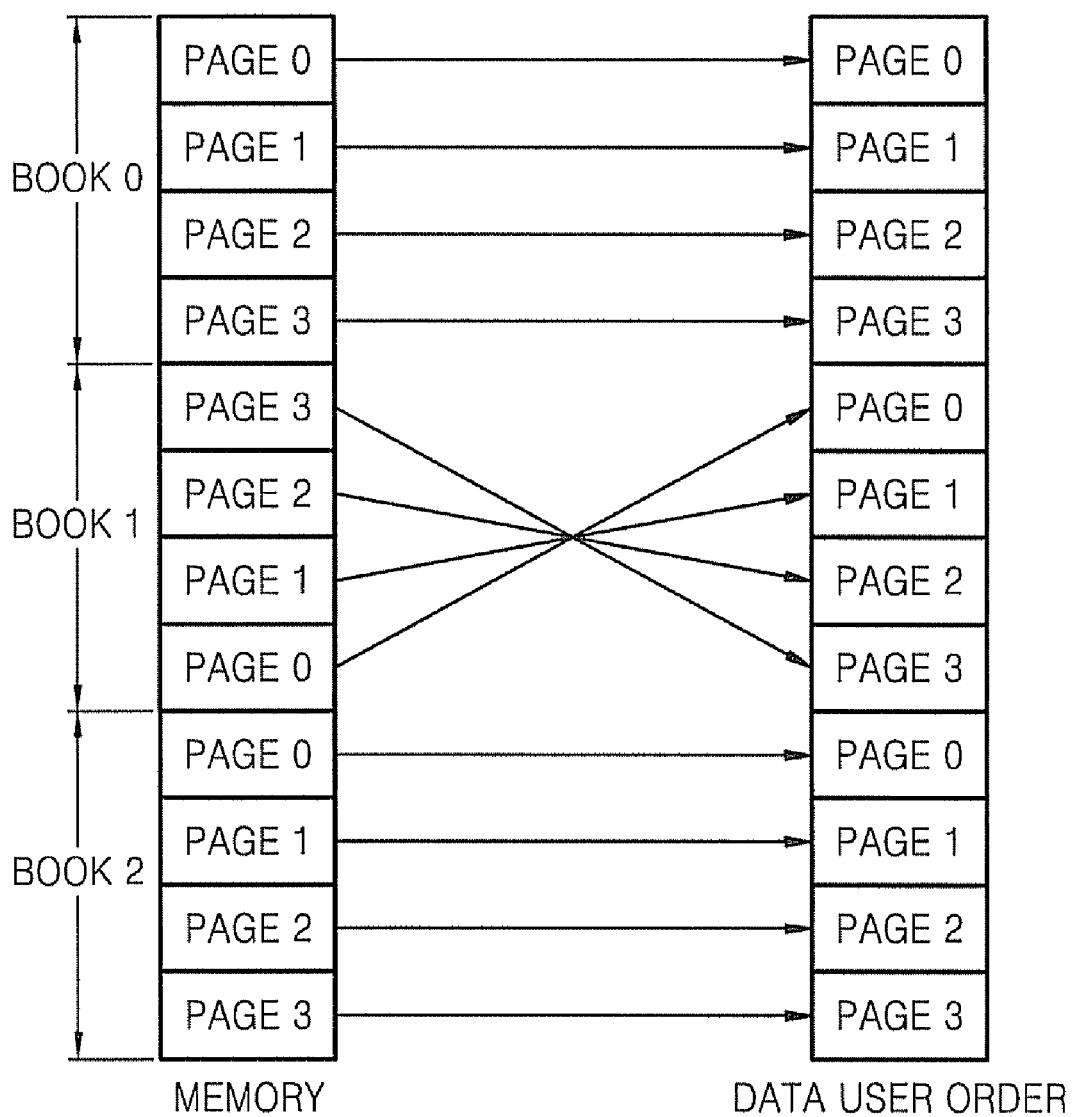
FIG. 5C illustrates an example of an order of data change as illustrated in FIG. 5B, according to an embodiment of the present invention.

According to another embodiment, to correct the reversed order of the pages in every other book, the memory unit 330 (FIG. 3) is used to store the decoded data and the order of the pages in every other book is switched into an increasing order when the data is transmitted from the memory unit 330 and used. FIG. 5C illustrates an example of an order of data change as illustrated in FIG. 5B. Referring to FIG. 5C, even when a book1 is stored in the memory unit 330 (FIG. 3) in a decreasing order of page3, page2, page1, and page0, the page order is reversed into an increasing order when the pages are transmitted from the memory so that the data stored in the pages can be properly used.

Figure 6A:
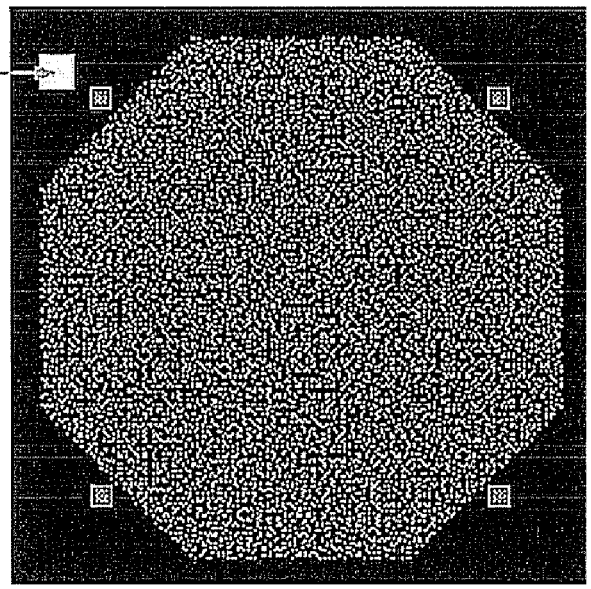
FIGS. 6A and 6B respectively illustrate a page in a decreasing order and a page in an increasing order, each page including order information according to an embodiment of the present invention.
Figure 6B:
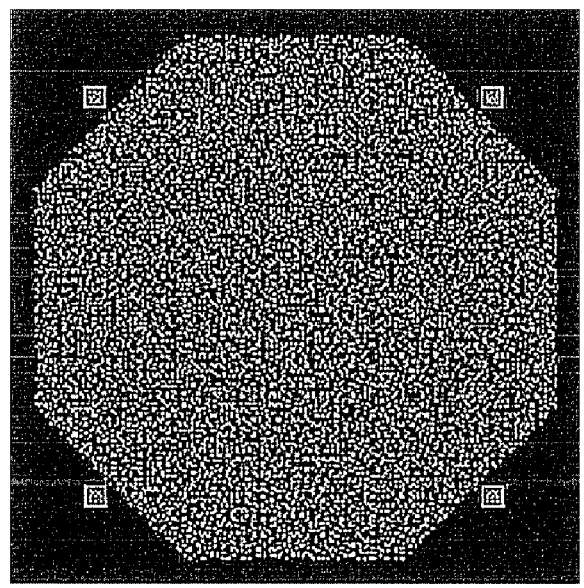

FIGS. 6A and 6B respectively illustrate a page in a decreasing order and a page in an increasing order, each page including order information according to an embodiment of the present invention. When reproducing starts from the holographic storage medium 100 (FIG. 3), it should be determined whether pages of a current book which is about to be reproduced are arranged in an increasing or decreasing order. Conventionally, to identify whether an order of the pages increases or decreases, at least two pages must be reproduced. If the page order is incorrectly set, the data may be reproduced in an incorrect decreasing order starting with page3 and continuing through page2, page1, and page0, instead of in a correct increasing order starting with page0 and continuing through page1, page2, and page3.

To overcome this problem, order information in the form of a bit, also known as an order identification bit, indicating whether a page is in an increasing or decreasing order is allocated to each of the page0, page1, page2, and page3, so that the page order can be identified by reproducing a single page instead of reproducing at least two pages. As illustrated in FIG. 6A, if the order information is found when data of a page is reproduced, the reproduced page and other pages included in the book being currently reproduced are determined as being arranged in a decreasing order. As illustrated in FIG. 6B, when no order information is found when data of a page is read, the page and other pages included in a current book may be determined as being arranged in an increasing order. Alternatively, including the order information in a page may indicate that the page and other pages included in the book being currently reproduced are arranged in an increasing order. Furthermore, other bit configurations may also be used to indicate page order, for example, multiple bits may be used to indicate increasing or decreasing order.

Figure 7:
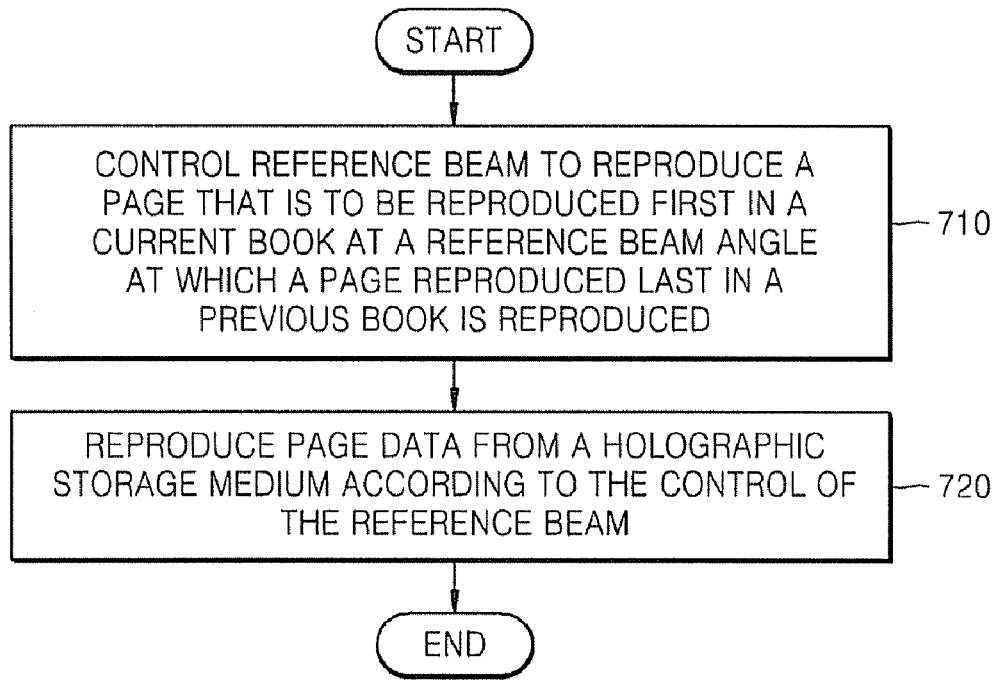
FIG. 7 is a flowchart of a method of reproducing data from a holographic storage medium according to an embodiment of the present invention.

FIG. 7 is a flowchart of a method of reproducing data from a holographic storage medium according to an embodiment of the present invention. In operation 710, a reference beam is controlled so that a page that is to be reproduced first in a current book is reproduced using a reference beam at a reference beam angle at which a last page reproduced in a previous book reproduced right before the current book was reproduced. In operation 720, the pages of the current book are reproduced from the holographic storage medium according to the control of the reference beam.

Figure 8:
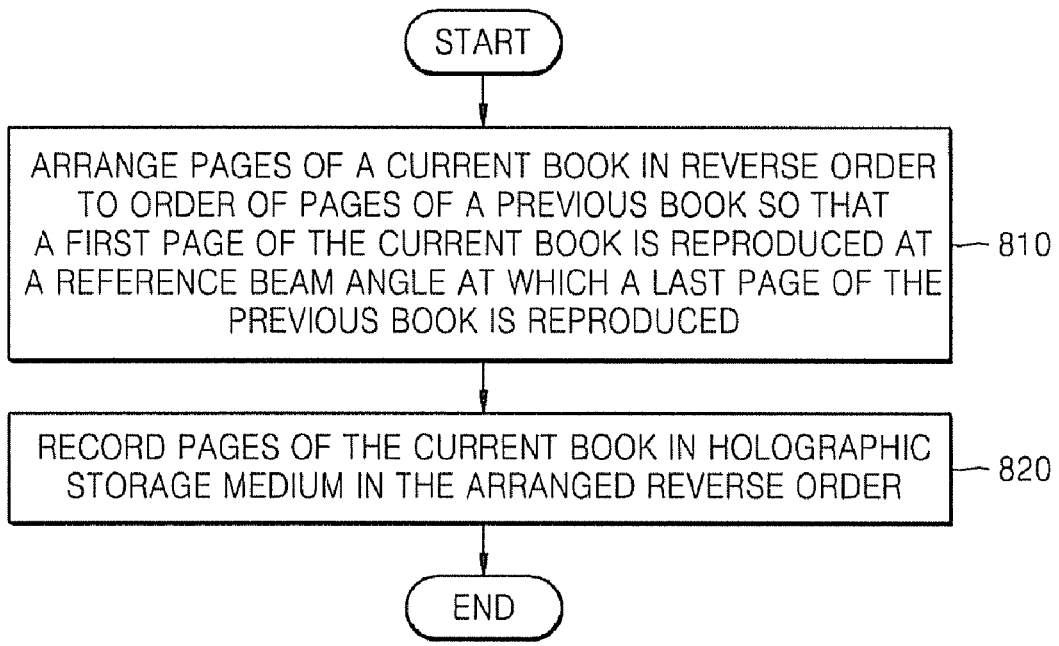
FIG. 8 is a flowchart of a method of recording data in a holographic storage medium according to an embodiment of the present invention.

FIG. 8 is a flowchart of a method of recording data in a holographic storage medium according to an embodiment of the present invention. In operation 810, pages of a current book are arranged in a reverse order to the order of pages of a previous book reproduced right before the current book so that the first page of the current book is reproduced at a reference beam angle at which the last page of the previously reproduced book was reproduced. In operation 820, the pages of the current book are recorded in the holographic storage medium in the arranged reverse order.

Figure 9:
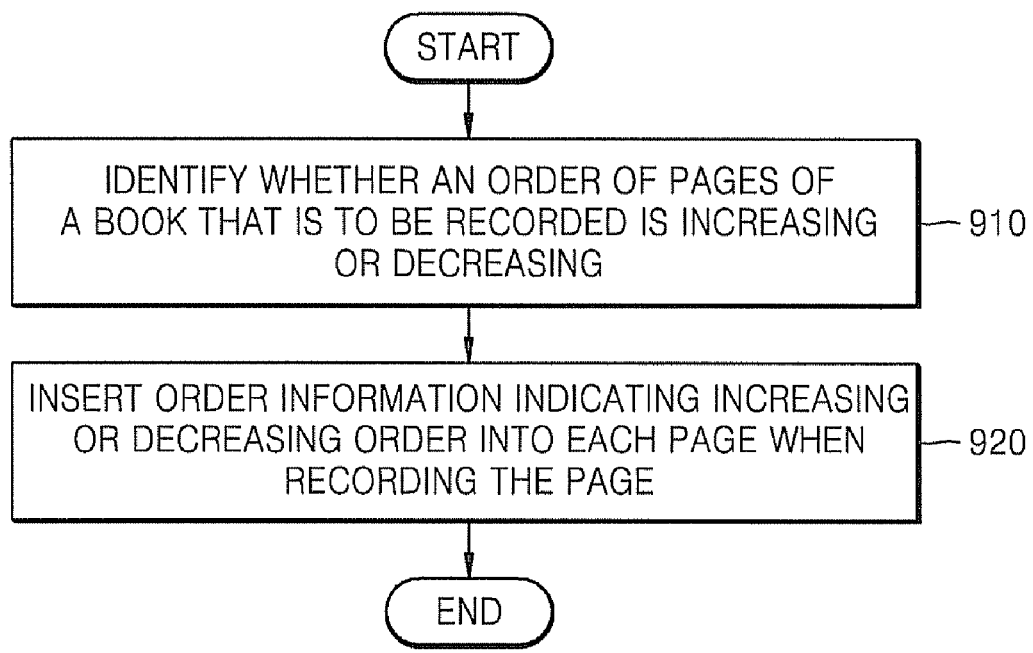
FIG. 9 illustrates a flowchart of a method of recording a page including order information in a holographic storage medium, according to an embodiment of the present invention.

FIG. 9 is a flowchart of a method of recording a page including order information in a holographic storage medium according to an embodiment of the present invention. In operation 910, the order of pages of a book that is to be recorded is identified as increasing or decreasing in order. In operation 920, order information indicating the increasing or decreasing order is inserted into each of the pages of the book when each of the pages is recorded.

According to aspects of the present invention, when each of the books recorded in a holographic storage medium is reproduced, it is not necessary to return a reference beam to an initial angle. As a result, a seamless transition is made between reproducing one book to reproducing a next book, and a reproducing speed is therefore increased. In addition, it is not necessary to return the reference beam to the initial angle during recording of the books, and therefore, a recording time is also reduced.

Aspects of the invention can also be embodied as computer readable codes on a computer readable recording medium. For example, the control unit 320 illustrated in FIG. 3 can be embodied as a computer program stored on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments to accomplish aspects of the present invention can be easily construed by programmers skilled in the art to which aspects of the present invention pertain.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of reproducing data from a holographic storage medium, in which a hologram containing data is recorded through interference between a signal beam and a reference beam, the data being recorded in pages, and a plurality of the pages being recorded in a book, the method comprising:
controlling the reference beam so that an increasing or a decreasing order of the reference beam in a current book which is currently reproduced is reverse to an increasing or a decreasing order of the reference beam in a previous book which was reproduced before the current book; and
reproducing pages of the current book from the holographic storage medium according to the controlling of the reference beam.

2. The method of claim 1, wherein an angle at which the reference beam is incident on the holographic storage medium is changed to reproduce each of the pages of the current book and pages of the previous book, and the controlling of the reference beam comprises controlling the reference beam so that a direction in which the angle of the reference beam is changed to reproduce the pages in the previous book is reverse to a direction in which the angle of the reference beam is changed to reproduce the pages in the current book.

3. The method of claim 1, wherein an order in which pages included in the previous book are arranged is opposite to an order in which the pages included in the current book are arranged.

4. The method of claim 1, wherein an order in which pages included in the previous book are arranged is the same as an order in which the pages included in the current book are arranged.

5. The method of claim 4, further comprising:
rearranging the order of the pages reproduced from the holographic storage medium according to whether the current book or the previous book has the pages in a decreasing order.

6. The method of claim 5, wherein the rearranging of the pages comprises:
identifying whether the current book or the previous book has pages in the decreasing order; and
switching the order of the reproduced pages of the book identified as having the pages in the decreasing order into an increasing order.

7. The method of claim 6, wherein the identifying whether the current book or the previous book has pages in the decreasing order comprises using order information included in each of the pages in the current book or the previous book.

8. The method of claim 7, wherein the order information comprises an order identification bit identifying whether the pages are in the increasing order or the decreasing order.

9. The method of claim 8, wherein the order identification bit indicates that the pages are in an increasing order.

10. The method of claim 8, wherein the order identification bit indicates that the pages are in a decreasing order.

11. The method of claim 1, wherein a page that is to be reproduced first among the pages in the current book is reproduced at a reference beam angle at which a page reproduced last among pages in a previous book reproduced right before the current book was reproduced.

12. A method of recording data from a holographic storage medium, in which a hologram containing data is recorded through interference between a signal beam and a reference beam, the data being recorded in pages, and a plurality of the pages being recorded in a book, the method comprising:

recording pages of a current book in the holographic storage medium in a different order from an order of pages of a previous book recorded right before the current book is recorded so that a first page of the pages in the current book is reproduced at a reference beam angle at which a last page of the pages in the previous book was reproduced.

13. The method of claim 12, wherein the recording of the pages of the current book in the holographic storage medium in the different order comprises recording the pages of the current book in a reverse order to the order of the pages of the previous book.

14. A method of recording data from a holographic storage medium, in which a hologram containing data is recorded through interference between a signal beam and a reference beam, the data being recorded in pages, and a plurality of the pages being recorded in a book, the method comprising:

inserting order information indicating an increasing or decreasing order of pages in a book into each of the pages of the book when the pages are recorded.

15. The method of claim 14, wherein the order information comprises an order identification bit identifying whether the pages are in the increasing order or the decreasing order.

16. The method of claim 15, wherein the order identification bit indicates that the pages are in an increasing order.

17. The method of claim 15, wherein the order identification bit indicates that the pages are in a decreasing order.

18. An apparatus to reproduce data from a holographic storage medium, in which a hologram containing data is recorded through interference between a signal beam and a reference beam, the data being recorded in pages, and a plurality of the pages being recorded in a book, the apparatus comprising:

an optical processing unit configured to reproduce pages from the holographic storage medium using the reference beam;

a memory unit configured to store the reproduced pages; and a control unit configured to control the reference beam so that an increasing or a decreasing order of the reference beam in a current book which is currently reproduced is reverse to an increasing or a decreasing order of the reference beam in a previous book which was reproduced before the current book.

19. The apparatus of claim 18, wherein:

an angle at which the reference beam is incident on the holographic storage medium is changed to reproduce pages of the current book and pages of the previous book, and the control unit is further configured to control the reference beam so that a direction in which the angle of the reference beam is changed to reproduce the pages in the previous book is opposite to a direction in which the angle of the reference beam is changed to reproduce the pages in the current book.

20. The apparatus of claim 18, wherein an order in which pages included in the previous book are arranged is reverse to an order in which pages included in the current book are arranged.

21. The apparatus of claim 18, wherein an order in which pages included in the previous book are arranged is the same as an order in which pages included in the current book are arranged.

22. The apparatus of claim 21, wherein the control unit is further configured to rearrange the order of either the pages in the previous book or the pages in the current book according to whether the pages in the previous book or the pages in the current book are arranged in a decreasing order before transmitting the pages to the memory.

23. The apparatus of claim 22, wherein the control unit is further configured to identify whether the previous book or the current book has the pages in the decreasing order, and switches the reproduced pages in the decreasing order into the increasing order.

24. The apparatus of claim 23, wherein the control unit is further configured to identify whether each of the reproduced pages in either the previous book or the current book is arranged in the decreasing order or the increasing order using order information included in each of the reproduced pages of either the previous book or the current book.

25. The apparatus of claim 24, wherein the order information comprises an order identification bit identifying whether the pages are in the increasing order or the decreasing order.

26. The method of claim 25, wherein the order identification bit indicates that the pages are in an increasing order.

27. The method of claim 25, wherein the order identification bit indicates that the pages are in a decreasing order.

28. The apparatus of claim 18, further comprising:

a light source configured to radiate a laser beam;

a beam splitter configured to split the laser beam into the signal beam and the reference beam;

a spatial light modulator configured to spatially light modulate the signal beam;

a first reflecting mirror configured to reflect the signal beam from the beam splitter to the spatial light modulator;

a second reflecting mirror configured to reflect the reference beam from the beam splitter to the holographic storage medium;

a first lens configured to focus the spatially light modulated signal beam output from the spatial light modulator to the holographic storage medium;

a second lens configured to focus the reference beam from the second reflecting mirror to the holographic storage medium; and a detector configured to detect the data output from the holographic storage medium created through the interference between the signal beam and the reference beam in the holographic storage medium.

29. The apparatus of claim 18, wherein a page that is to be reproduced first among pages in a current book is reproduced at a reference beam angle at which a page reproduced last among pages in a previous book reproduced right before the current book was reproduced.

30. An apparatus to record data in a holographic storage medium, in which a hologram containing the data is recorded through interference between a signal beam and a reference beam, the data being recorded in pages, and a plurality of pages being recorded in a book, the apparatus comprising:

an optical processing unit configured to record pages of a current book and pages of a previous book recorded right before the current book in the holographic storage medium using the signal beam and the reference beam; and a control unit configured to arrange the pages of the current book in a reverse order to an order of the pages of the previous book so that a first page of the current book is reproduced at a reference beam angle at which a last page of the previous book was reproduced, and to transmit the pages of the current book to the optical processing unit in order to be recorded.

31. An apparatus to record data in a holographic storage medium, in which a hologram containing the data is recorded through interference between a signal beam and a reference beam, the data being recorded in pages, and a plurality of pages being recorded in a book, the apparatus comprising:
- an optical processing unit configured to record pages of a book in the holographic storage medium using the signal beam and the reference beam; and
- a control unit configured to insert order information indicating an increasing or a decreasing order into each of the pages, and to transmit the pages to the optical processing unit to record the pages including the order information.

32. The apparatus of claim 31, wherein the order information comprises an order identification bit identifying whether the pages are in the increasing order or the decreasing order.

33. The apparatus of claim 32, wherein the order identification bit indicates that the pages are in an increasing order.

34. The apparatus of claim 32, wherein the order identification bit indicates that the pages are in a decreasing order.

35. A holographic storage medium, in which a hologram containing data is recorded through interference between a signal beam and a reference beam, the date being recorded in pages, and a plurality of the pages being recorded in a book, the holographic storage medium comprising:
- recorded pages of a previous book; and
- recorded pages of a current book which are recorded right after the pages of the previous book are recorded,
- wherein an order in which the pages of the previous book are recorded is reverse to an order in which the pages of the current book are recorded.

36. A holographic storage medium, in which a hologram containing data is recorded through interference between a signal beam and a reference beam, the data being recorded in pages, and a plurality of pages being recorded in a book, the holographic storage medium comprising:
- recorded pages of a book,
- wherein each of the pages includes order information indicating whether the pages included in the book are recorded in an increasing order or a decreasing order.

37. The holographic storage medium of claim 36, wherein the order information comprises an order identification bit identifying whether the pages are in the increasing order or the decreasing order.

38. The method of claim 36, wherein the order identification bit indicates that the pages are in an increasing order.

39. The method of claim 36, wherein the order identification bit indicates that the pages are in a decreasing order.

* * * * *